UNITED STATES PATENT OFFICE.

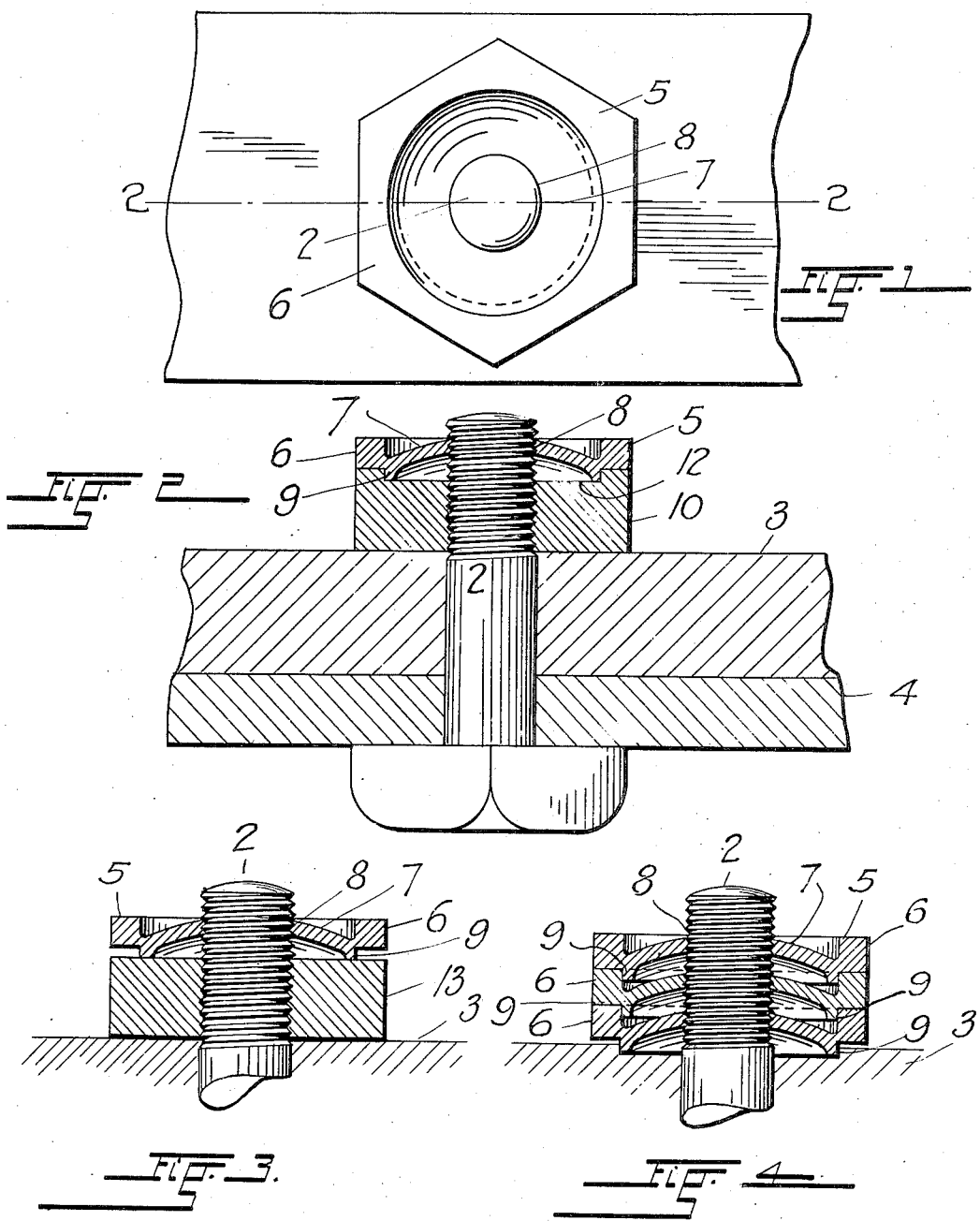

HENRY C. OEHRLE, OF DENVER, COLORADO.

LOCKING-NUT.

1,179,861.   Specification of Letters Patent.   Patented Apr. 18, 1916.

Application filed March 10, 1915. Serial No. 13,320.

*To all whom it may concern:*

Be it known that I, HENRY C. OEHRLE, a citizen of the United States, residing at Denver, in the county of Denver and State of Colorado, have invented certain new and useful Improvements in Locking-Nuts, of which the following is a specification.

This invention relates to improvements in self-locking nuts and its object resides in providing a nut of very simple and economical construction which when screwed onto the coöperatively threaded portion of a bolt against a fixed object, will automatically lock itself in its adjusted position against return movement. My improved nut is capable of producing this result without the coöperation of other parts and it can for this reason be used singly or in connection with other nuts of either similar or different construction.

The improved nut can be produced at a cost not exceeding that of ordinary nuts and inasmuch as it locks automatically when screwed against an abutting surface, it can be effectively applied by any one without special instructions.

An embodiment of my invention is illustrated in the accompanying drawings in the various views of which like parts are similarly designated, and in which, Figure 1 is a plan view of a bolt to which my improved self-locking nut has been applied, Fig. 2, a section along the line 2—2, Fig. 1, and Figs. 3 and 4, sections similar to Fig. 2, showing different methods of applying the nut.

Referring to the drawings, the numeral 2 designates a bolt of ordinary construction used in connecting two parts 3 and 4.

My self-locking nut which in its entirety is designated by the numeral 5, consists of a rigid rim 6 formed integrally around a concave or dished web 7 which has a central, threaded opening 8 to receive the coöperatively threaded end of the bolt. The nut has at its inner or contact surface surrounding its concavity, a circular lip 9 which in the operation as will hereinafter be described, serves to secure its concave portion against outward expansion.

In the construction shown in Fig. 2, the locking nut is used as a jam nut in conjunction with a nut 10 which engages the surface of one of the parts to which the bolt is applied. The nut 10 may be provided with a circular recess 12 to receive the lip 9 of the locking nut or it may be of ordinary construction like the nut 13 shown in Fig. 3, in which case, the lip on the nut 5 upon being screwed against a surface of the other nut will produce its own seat by furrowing the metal during its rotary movement. The rim 6 of the nut is exteriorly, of polygonal form for the application of a wrench, and at one side of the nut, it is made interiorly circular to provide a recess for the reception of the lip 9 of another similar nut placed against it as shown in Fig. 4.

In applying the locking nut to a bolt, it is screwed against a stationary object such as one of the nuts 10 and 13 shown in Figs. 2 and 3. When the locking nut is screwed against a nut of the form shown in Fig. 2, the lip 9 entering the recess 12 of the same, prevents radial expansion of the concave web of the locking nut, with the result that when by means of a wrench, the latter is forcibly driven against the other nut, the web will tend to flatten and thereby press inwardly against the threaded portion of the bolt. The resultant clamping action between the threads in the nut and those on the bolt will securely lock the nut against movement in either direction to the extent that it cannot be moved except by a force exceeding that by which it was screwed home.

The clamping action of the nut on the bolt does in no way injure or deform the thread of either, and the nuts may therefor be removed and used repeatedly without deteriorating their self-locking properties. In case the nut is screwed against a flat non-recessed surface such as that presented by the nut 13, its lip while rotating about the axis of the bolt will furrow into the metal of the nut 13 and thereby seat itself so as to prevent outward expansion of the web 7. In this connection I desire it understood that while the use of the lip is advantageous in effecting the clamping action between the threads on the nut and the bolt, the rigidity of the rim of the nut is usually sufficient to prevent without the aid of other means, the outward expansion of the concave portion of the same.

By applying a number of self-locking nuts to one bolt as shown in Fig. 4, their circular lips by entering the spaces within the rims of the preceding nuts, effect the required result so that each nut will individually have a clamping action on the bolt and coöperate with the others to hold the nut applied, against displacement.

Having thus described my invention what I claim and desire to secure by Letters-Patent is:

1. A self-locking nut having an inner portion which has a threaded opening and is capable of deformation when subjected to pressure, by a compensating reduction in the diameter of its opening, and a rigid outer portion which prevents the inner portion from expanding outwardly and which has at one side a circular lip concentric with said opening and at its opposite side a circular recess the diameter of which slightly exceeds the outer diameter of the lip.

2. A self locking nut comprising a rigid annular rim and integrally within the same, a deformable concavo-convex web of reduced thickness which has a central threaded aperture.

3. A self-locking nut comprising a rigid annular rim, integrally within the same, a deformable concavo-convex web of reduced thickness which has a central threaded aperture, and a lip on the said rim, adapted to enter a depression in an object against which the nut is screwed.

In testimony whereof I have affixed my signature in presence of two witnesses.

HENRY C. OEHRLE.

Witnesses:
G. J. ROLLANDET,
L. RHOADES.